United States Patent
Son et al.

(10) Patent No.: US 7,203,201 B2
(45) Date of Patent: Apr. 10, 2007

(54) LOGICAL NODE IDENTIFICATION IN AN INFORMATION TRANSMISSION NETWORK

(75) Inventors: Yong Ho Son, Palo Alto, CA (US); Nikhil Rajdev, San Jose, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 387 days.

(21) Appl. No.: 10/663,256

(22) Filed: Sep. 16, 2003

(65) Prior Publication Data

US 2004/0062270 A1  Apr. 1, 2004

Related U.S. Application Data

(63) Continuation of application No. 09/436,934, filed on Nov. 8, 1999, now Pat. No. 6,697,376.

(60) Provisional application No. 60/109,341, filed on Nov. 20, 1998.

(51) Int. Cl.
*H04L 12/56* (2006.01)
(52) U.S. Cl. .................................................. 370/401
(58) Field of Classification Search ................ 370/468, 370/401; 725/95
See application file for complete search history.

(56) References Cited

U.S. PATENT DOCUMENTS

| | | | |
|---|---|---|---|
| 5,412,720 A | 5/1995 | Hoarty | 380/211 |
| 5,481,542 A | 1/1996 | Logston et al. | 725/132 |
| 5,557,317 A | 9/1996 | Nishio et al. | 348/7 |
| 5,650,994 A | 7/1997 | Daley | 370/259 |
| 5,671,217 A | 9/1997 | Adams et al. | 370/233 |
| 5,905,726 A | 5/1999 | Gupta | 370/390 |
| 6,253,375 B1 | 6/2001 | Gordon et al. | 725/88 |
| 6,295,298 B1* | 9/2001 | Hrastar et al. | 370/409 |
| 6,378,130 B1 | 4/2002 | Adams | 725/95 |
| 6,510,157 B2 | 1/2003 | Kwok et al. | 370/395.2 |
| 6,591,422 B1 | 7/2003 | Cesar et al. | 725/95 |
| 6,697,376 B1* | 2/2004 | Son et al. | 370/465 |
| 2002/0042924 A1 | 4/2002 | Adams | 725/95 |
| 2003/0135862 A1 | 7/2003 | Komatsu et al. | 725/95 |

OTHER PUBLICATIONS

"Optimizing of Downstream Delivery on a CATV Network," IEEE Communications, Jun. 23, 1996 Jun. 27, 1996, pp. 1138-1142.
"The High-Tech Behind Broadcasting DIRECTV," DirecTV System Technology; p. 1-3.

(Continued)

*Primary Examiner*—Derrick W. Ferris
(74) *Attorney, Agent, or Firm*—Patterson & Sheridan, LLP

(57) ABSTRACT

A system for generating and sending a Logical Node identification signal as part of a data stream is disclosed. The system also includes subscriber stations capable of receiving and extracting Logical Node identification information from a data stream. The subscriber stations create new messages including the Logical Node identification signal and send the message to the transmission network system control, such that switching of data streams to an appropriate channel over the information transmission network is done consistent with the network topology.

5 Claims, 8 Drawing Sheets

OTHER PUBLICATIONS

"Today's Video Servers: Key Technology Issues, Reaping the Benefits of Video-On-Demand is Not Without its Challenges," DelKunert, Concurrent Computer Corporation, Broadband Systems & Design, 6 pages.

"The Impact of Digital Video Servers on Broadcast Studio Efficiency, Profitability and Growth," Ernie G. Leon, Concurrent Computer Corporation, Ft. Lauderdale, Florida, 14 pages.

"A Migration Strategy To High Capacity Return on HFC," Jim Chiddix, Time Warner Cable, Donald Gall, Time Warner Cable, Gerry Shimirak, Raychem, Time Warner Cable, pp. 1-11.

"The Interactive Video Network: An Overview of the Video Manager and the V Protocol," Roger E. Libman et al., AT&T Technical Journal, Vo. 74, No. 5, Sep. 1, 1995, pp. 92-105, XP000531012.

* cited by examiner

LOGICAL NODE IDENTIFICATION IN AN INFORMATION TRANSMISSION NETWORK

CROSS-REFERENCE TO RELATED APPLICATION

This application is a continuation of U.S. Ser. No. 09/436,934 filed on Nov. 8, 1999 now U.S. Pat. No. 6,697,376 B1 which claims the benefit of Provisional application Ser. No. 60/109,341 filed Nov. 20, 1998.

BACKGROUND OF THE INVENTION

1. Field of the Invention

This invention relates generally to the field of information transmission networks and more specifically to Logical Node identification of such networks. More particularly, the present invention relates to Logical Node identification of such networks supporting session based routing/switching of information flow in heterogeneous networks.

2. Description of the Background Art

In the field of information transmission, routing and switching of information to the destination node is most commonly accomplished in one of two approaches: (1) symmetric switched virtual paths/circuits (i.e., ATM) or (2) packet-based routed networks (i.e. Internet). A third type of information routing/switching network exists in many forms that can be better supported through a variant of the two approaches with asymmetric switched virtual paths/circuits or asymmetric packet based routing.

This third area can be classified into two categories: first, the set of information transmission networks that require a combination of the packet routed networks tightly coupled with asymmetric switched networks (i.e. interactive multimedia content delivery such as in video-on-demand that requires a streaming network flow for video and audio and usually an Out Of Band IP network to handle the interactivity between the source and destination); second, the set of information transmission networks that can improve network latency by taking advantage of the knowledge of the point of access in packet based networks (i.e., dynamic routing changes necessary to support unique roving lap top computers). The present application will address this first case.

The former category of information transmission networks is what the present invention will address in detail. In particular, the interactive multimedia service of video-on-demand over Hybrid Fiber Coax (HFC) networks is currently in existence for cable services. In this case, there exists unidirectional content streaming (QAM modulated video and audio streaming of content to the digital set top box in the home) and IP based interactivity (via Out Of Band downstream to the home and a varied Return Path packet forwarding connectivity from the subscriber's set top box to the cable headend equipment). This same solution can be used for satellite broadcast (content delivery) with wireless (cell phone) or telephone modem for interactivity; as well as for terrestrial broadcast systems (e.g. MMDS, LMDS). It is also noted that the control session via the Out Of Band could also be multiplexed into the streaming link in the In Band.

A technique to increase the number of video-on-demand programs that can be concurrently transmitted is by channel reuse, where programs are assigned to channels at an intermediate node (typically referred to as a "remote headend" or "hub") where lines from individual subscriber stations are coupled to the main CATV network. For the purposes of the present invention, the term "headend" is defined as any physical site where modulation, demodulation, and processing (controlling, monitoring, etc.) equipment are kept and operated whether they be staffed with human operators or unstaffed sites that are remotely monitored whether they relate specifically to Cable or other transmission means such as MMDS. This technique allows the same channels to be assigned to different programs at different nodes (known as spectrum reuse through physical media partitioning). Thus, dedicated video-on-demand channels can transmit programs to one set of subscriber stations coupled to a first hub, while the same channels can be used to transmit a different set of programs to another set of subscriber stations coupled to a second hub.

Typically, provision of video-on-demand services is implemented by assigning a session control manager (SCM) to one or more hubs. The SCM is responsible for receiving requests from set-top boxes at associated hubs and providing the requested services. Each SCM must then be informed of the subscriber stations corresponding to the assigned hub. Based on this topological information, the SCM provides the information for the creation of a virtual circuit from the video server to the QAM modulator, and thus an access mechanism to the video and audio stream from the set top box. The SCM also tells the set top box which frequency to tune the demodulator and which packet identification numbers (PIDs) to filter for the video and audio streams.

If subscriber stations are added or deleted, such as by new or canceled subscriptions, then the mapping between SCMs, hubs, and set top boxes may need to change. For example, a set of QAM channels can only accommodate a certain number of subscriber stations. If the number of subscriber stations on a hub exceeds the capacity of the allocated stream, then further Logical Node partitioning may occur on the hub. While such changes can be made to the mapping information in the headend manually, it is desirable to have a more efficient and automated method for re-assigning channels for node usage.

SUMMARY OF THE INVENTION

In a principal aspect, the present invention provides automatic transmission to subscriber stations of information about corresponding session control managers and coupling of channel groups defined as nodes.

In accordance with the principles of the present invention, a video-on-demand (VOD) system includes a plurality of session control managers to cause transmission of a requested program to a requesting subscriber station. The video-on-demand system is coupled to a plurality of subscriber stations by a network capable of spectrum reuse between the subscriber station and a corresponding one of a plurality of nodes disposed between the video-on-demand system and the subscriber station. The video-on-demand system comprises a Logical Node assignor which assigns a logical identification to each of the nodes to identify a correspondence between each of the nodes and a corresponding one of the session control managers. For example, a Logical Node for HFC is defined as the group of Fiber Nodes that share the same QAM modulation spectrum. I.e. same streams in VOD channels.

In accordance with further aspects of the invention, the Logical Node assignor periodically transmits node assignment information to each of the nodes in the network to uniquely identify the Logical Node and also identify a corresponding session control manager for each of the nodes. This allows for the subscriber stations tune to this digital channel at any time and get these information on a timely basis. Advantageously, such techniques allows automatic dissemination of information regarding mapping between session control managers, Logical Nodes, and subscriber stations. The result is reduced complexity and overhead in managing a video-on-demand system, thereby reducing overall costs.

The principles of the present invention are particularly advantageous in Hybrid Fiber Coaxial (HFC) systems used for transmission of video programming. However, the principles described herein may also be used in direct broadcast satellite (DBS) systems, Local Multi-Point Distribution Services (LMDS), and Multi-channel Multi unit Distribution Systems (MMDS).

One particular advantage of the present invention, is that because of the automatic identification of the Logical Node to which each subscriber station is associated, the present invention allows for switching the unicast VOD stream to the correct QAM modulator that modulates to the Logical Node for receipt by the subscriber station. This is particularly advantageous as new Logical Nodes can be created or existing nodes are divided because of increasing demand for subscription and service.

These and other features and advantages of the present invention may be better understood by considering the following detailed description of a preferred embodiment of the invention. In the course of this description, reference will frequently be made to the attached drawings.

DETAILED DESCRIPTION OF THE PREFERRED EMBODIMENTS

Figure 1:
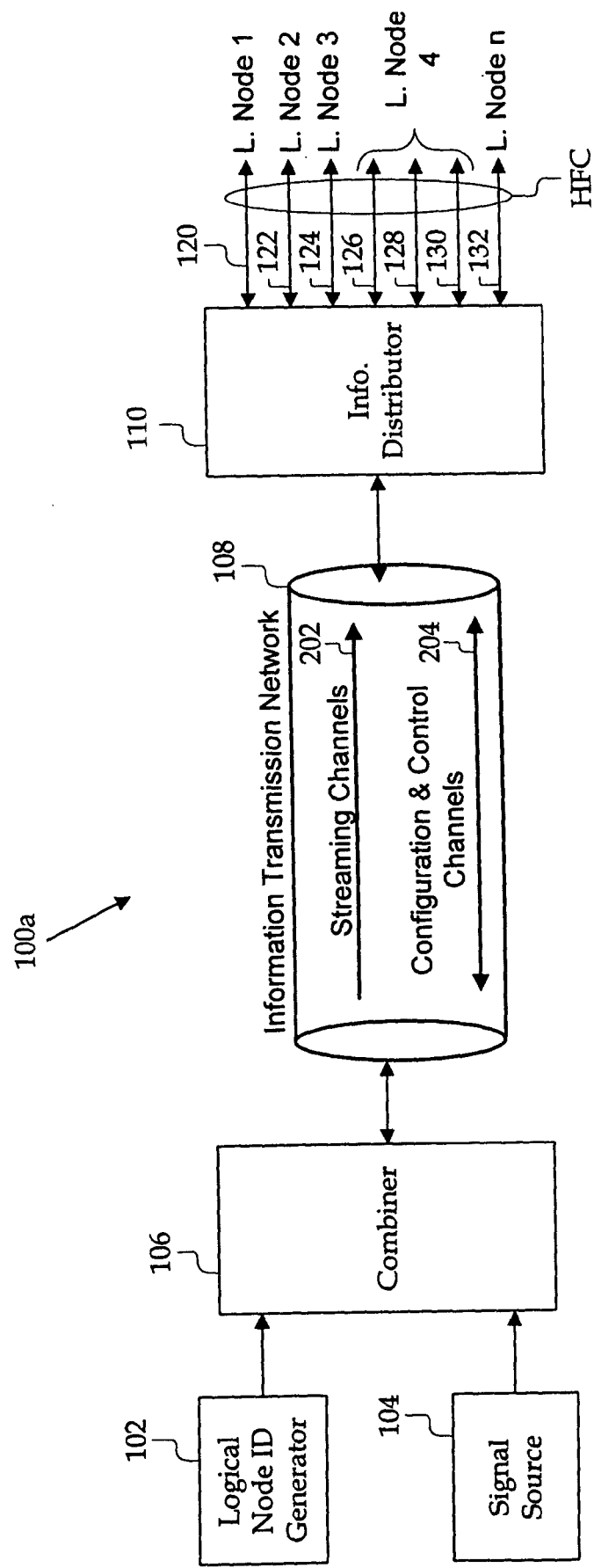
FIG. 1 is a block diagram of a general embodiment of a system employing the principles of the present invention.

Referring now to FIG. 1, a preferred embodiment of a system 100a constructed in accordance with the present invention is shown. The system 100a preferably comprises: a Logical Node Identification (ID) generator 102, a signal source 104, a combiner 106, an information transmission network 108, and an information distributor 110. The present invention is particularly advantageous because it inserts a Logical Node identification signal into the data stream. This Logical Node identification signal is transmitted through the network 108, and then retransmitted back to the SCM 224 (See FIG. 2B) for determining the precise configuration of the system 100a.

Figure 2A:
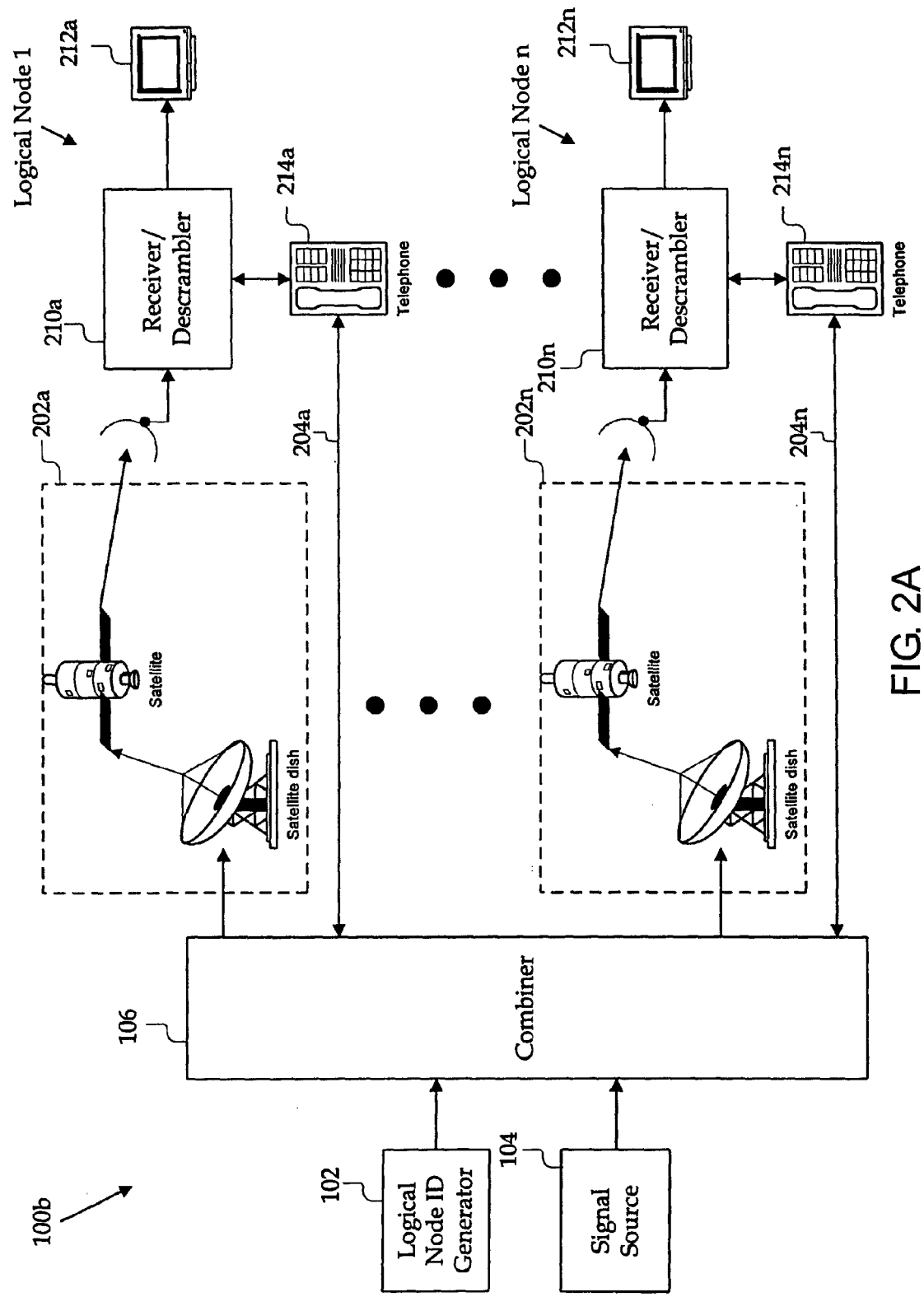
FIG. 2A is a block diagram of a first embodiment of the system employing the principles of the present invention where a broadcast satellite is used as a portion of the transmission network.
Figure 2B:
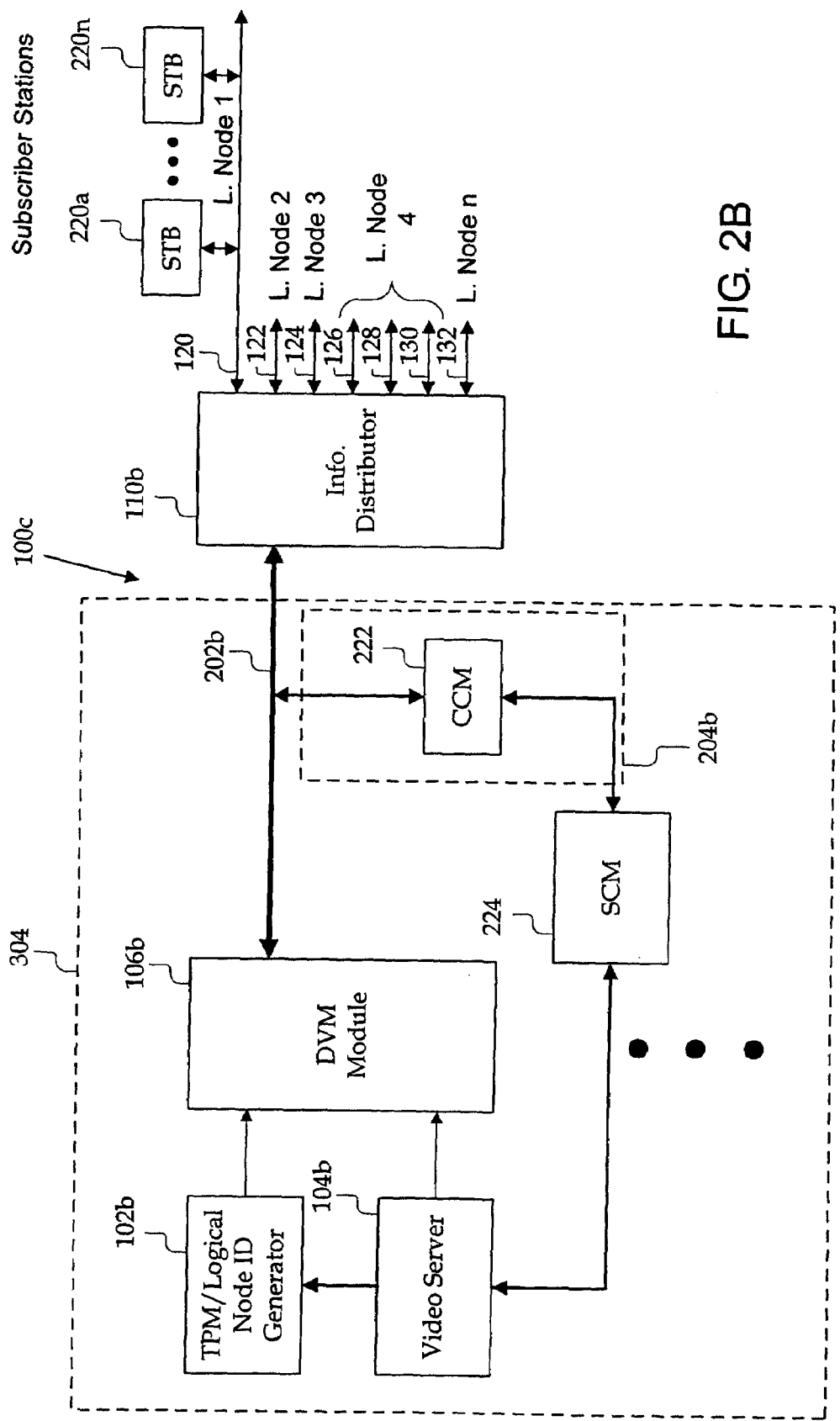
FIG. 2B is a block diagram of a second and preferred embodiment of the system employing the principles of the present invention where an video-on-demand network is used as the transmission network.

This first embodiment illustrates the most general implementation of the present invention, and therefore, will be described here in only general terms. FIGS. 2A and 2B illustrate more particular embodiments of the present invention for specific transmission networks and will be described with more particularity.

The Logical Node ID generator 102 produces at least one unique Logical Node identification number and transmits the unique identification number as a signal at the output of the Logical Node ID generator 102. Preferably, the Logical Node ID generator 102 produces plurality of unique identifiers which are sent to the combiner 106 and combined with other information according to which node or location to which the information is being transmitted. The output of the Logical Node generator 102 is coupled to an input of the combiner 106. A signal source 104 providing video, sound or data signals such as in a digital video signal is provided at the output of the signal source 104, and also provided to the combiner 106. The output of the signal source 104 is coupled to the second input of the combiner 106.

The combiner 106 has one more outputs coupled to an information transmission network 108 for transmitting a combined signal that includes an address for the information, content from the signal source 104, and the Logical Node ID signal from the Logical Node ID generator 102 to the information distributor 110 coupled at the remote end of the transmission network 108. In the preferred embodiment, the transmission network 108 includes one or more stream channels 202 for transmitting information from the combiner 106 to the devices downstream on the remote end of the information transmission network 108. The information transmission network 108 also includes configuration control channels 204 for sending signals along a reverse path between the information distributor 110 and combiner 106.

The information distributor 110 is coupled to send and receive signals over the information transmission network 108. The information distributor 110 is also coupled to a plurality of devices (not shown) such as set top boxes by a plurality of signal lines 120–132. The information distributor 110 receives the streaming channels and sends the source signal and the Logical Node ID down a corresponding one or more signal lines 120–132 according to the node ID number. For example, a group of signals sent over the information transmission network 108 and received by the information distributor 110 having video content and a Logical Node ID number of 1 would be transmitted only over signal line 120. Such video content and a Logical Node ID are not transmitted over other signal lines 122–132 for nodes 2-n. Other combined signals would be similarly sent over the respective signal lines 122–132 corresponding to their Logical Node identification number. As shown, an individual Logical Node identification number such as Logical Node 4, may correspond to a plurality of signal lines such as signal lines 126, 128, 130. In one embodiment, the signal lines 120–132 may be constructed of hybrid/fiber coax. Thus, the information distributor 110 effectively separates the data streamed over the streaming channels 202 for distribution over individual signal lines or groups of signal lines consistent with channel reuse.

The information distributor 110 also receives a plurality of signals sent upstream by devices (not shown) to the information distributor 110. The information distributor 110 in turn sends the signals over the configuration and control channels 204 to the combiner 106. In this manner, a particular set top box (STB 220 see FIG. 2B) or subscriber station can receive a signal including the Logical Node ID, incorporate the Logical Node ID along with a signal identifying the subscriber station, and send the incorporated signal upstream through the information distributor 110 and configuration and control channels 204 to the combiner 106. Using this information, the SCM 224 determine the exact configuration of the network and nodes, make necessary changes (e.g. create new nodes, eliminate node or combine nodes) to maximize the usage of the network bandwidth.

Referring now to FIG. 2A, a second embodiment 100b of the system constructed in accordance with the present invention is shown. In the second embodiment 100b, like components having the same functionality have been labeled with like reference numeral for ease of understanding and convenience. The second embodiment 100b includes the Logical Node Identification (ID) generator 102, the signal source 104, the combiner 106, and a transmission network in the form of a streaming channel 202a and a return channel 204a. The information distributor takes the form of a receiver and descrambler 210a, and a telephone 214a.

The Logical Node Identification (ID) generator 102, the signal source 104, the combiner 106 are the same as has been described above with reference to FIG. 1. However, in this embodiment, the combiner 106 transmits the combined signal to a one or more base satellite stations for uploading to a satellite. The satellite in turn receives and transmits the combined signal including the Logical Node ID to the receiver and descrambler 210a. While only one receiver and descrambler 210a is shown per satellite, those skilled in the area will realize that there are preferably many receivers and descramblers 210a for each satellite.

The receiver and descrambler 210a receives the combined signal from the satellite, descrambles the signal and sends the combined signal to one or more devices 212a coupled to the receiver and descrambler 210a. The receiver and descrambler 210a is also coupled by a telephone 214a–214n and a phone line 204a–204n to the combiner 106. The path through the telephone and a public switched network provides the return path. Those familiar in the art will recognize that the telephone 214a–214n and phone line 204a–204n could be a cell or wireless telephone. Thus, the receiver and descrambler 210a is able to communicate with the devices 212a to determine channel selection and node ID and send that information back to the combiner 106 via the telephone line 204a–204n. In this manner, the system 100b may define a plurality of Logical Nodes, change or modify the nodes as desired and confirm the network configuration through use of the Logical Node ID signal inserted by the combiner 106 and returned by the device 212a–212n and the receiver and descrambler 210a–210n.

Referring now to FIG. 2B, a third and preferred embodiment of a system 100c constructed in accordance with the present invention is shown. The third embodiment 100c uses the capabilities of a traditional cable system to provide the streaming channel 202b and the return channel provided with video-on-demand systems as the return path. The third embodiment 100c preferably comprises a Logical Node Identification (ID) generator 102b, a video server 104b as the signal source, a combiner in the form of a digital video modulator (DVM) module 106b, the optical fiber 202b as the transmission network, a control channel modem (CCM) 222 and a session control manager (SCM) 224 providing the return path 204b, and an information distributor 110b. The system 100c advantageously uses a plurality of DVMs 106b and each has a plurality of channels. Each DVM 106b preferably provides the video streams to different Logical Nodes. Thus, the automatic identification of the Logical Node in the return channel, allows the SCM 224 to determine which video stream and channel provided by which DVM corresponds to a particular set top box 220. This is particularly advantageous because there is routinely a need to re allocated the set top box 220 among Logical Nodes and DVM channels.

The DVM module 106b receives video signal from the video server 104b and node ID signals from the Logical Node Identification (ID) generator 102b. The DVM module 106b combines these signals and transmits them over the transmission channel 202b to the information distributor 110b. The SCM 224 controls the mixing of content provided by the video server 104b and receives communication over the back or return path 204b via CCM 222. For example, some of these components may be found at a headend in a typical on-demand cable system. The information distributor 110b divides the signals received from the DVM module 106b and outputs them over respective signal lines 120–132 according to the Logical Node ID assigned to each signal. For example, a plurality of set top boxes 220a–220n are coupled to line 120 and form Logical Node 1. Each of the other signal lines 122–132 or groups of the signal lines are coupled in similar fashion to form Logical Nodes of the network. Such any exemplary system is described in more detail in U.S. Pat. No. 6,253,375, issued Jun. 26, 2001, entitled "System For Interactively Distributing Information Services," filed Dec. 4, 1997, which is incorporated herein by reference.

In this third embodiment 100c, the Logical Node generator is preferably part of a transport processing module 102b. The transport processing module (TPM) 102b adds control signals and data to the streams generated by the DVMs 106b. The TPM 102b is preferably coupled to the session control manager 224 and to the CCMs 222 through the VME bus architecture. The TPM 102b is also coupled to the DVM module 106b to provide for in-band communication. More specifically, the TPM 102b also adds identification information to the video and audio content provided by the server 104b such as program specific information (PSI) and packet identification numbers (PIDs).

Figure 3:
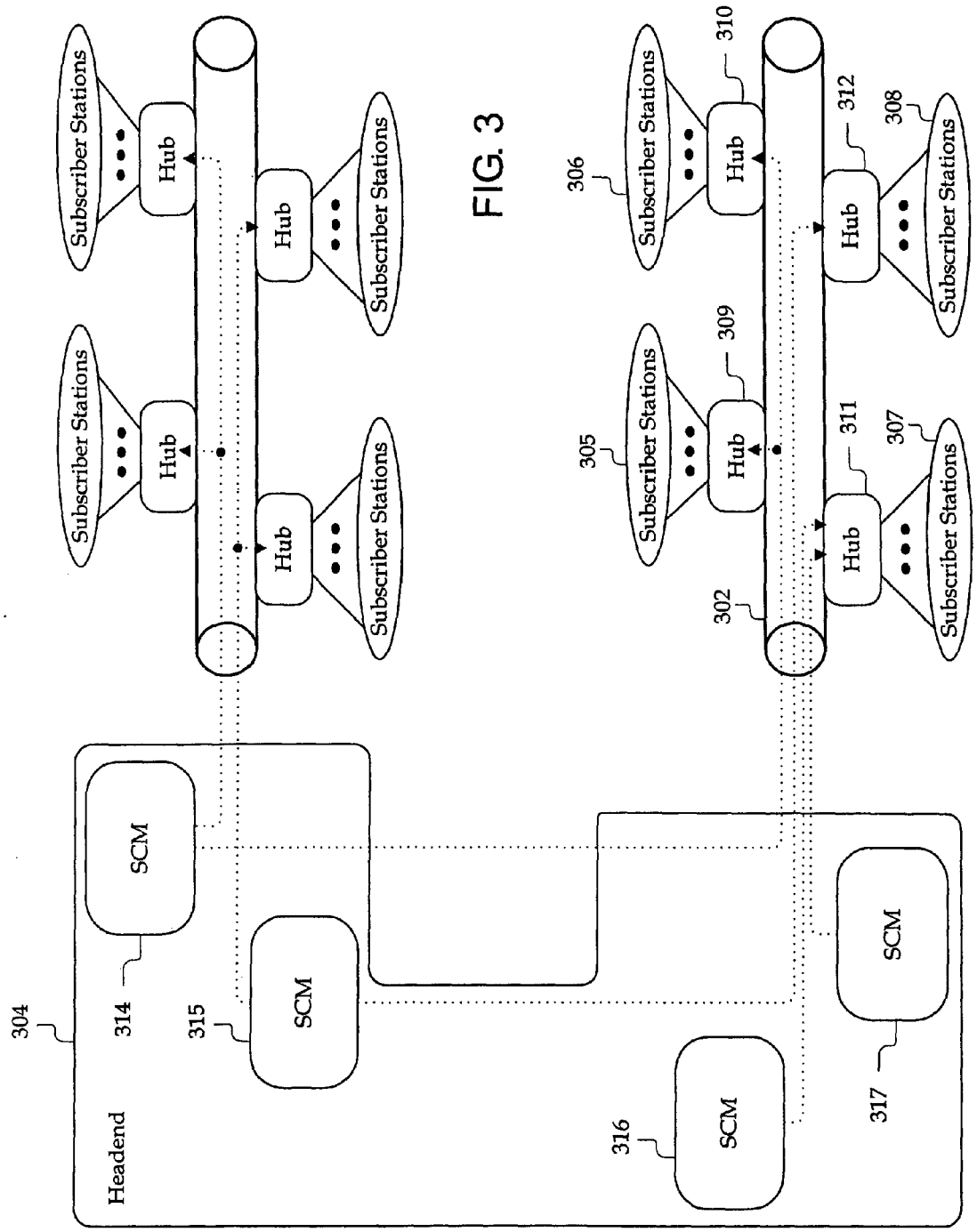
FIG. 3 is a high-level block diagram showing a headend including session control mangers, the hubs and the subscriber stations of the second embodiment in more detail.

In FIG. 3, a plurality of subscriber stations 305–308 are coupled by an information transmission network 302 to a cable headend 304 for receiving video programming services. The subscriber stations 305–308 preferably take the form of a digital set-top box capable of requesting video programming from the headend 304. However, the subscriber stations 305–308 can take other forms to provide information from network 302 to different types of output devices, e.g. cable modems with personal computers and ADSL modems with set top boxes. The subscriber stations 305–308 are shown generally and each shown subscriber station 305–308 represents a plurality of subscriber stations.

The headend 304, which is shown only in very general form, includes the necessary equipment and capability to provide subscriber stations 305–308 with on demand services such as, for example, video-on-demand services where a user requests a particular movie through a subscriber station and the headend 304 responds by transmitting data representing the movie to the requesting subscriber station for viewing by the user. Included within the headend 304 are a plurality of session control managers (SCMs) 314, 315, 316 and 317. The SCMs perform various system command and control functions as well as communicating the requested programming in the form of a data stream to the transmission network 302. The SCMs 314, 315, 316 and 317 have capability to address the streams to be propagated to the subscribers in broadcast, multicast or unicast modes. As used herein, the term "broadcast" means transmission of data for receipt by all subscriber stations on the network. "Unicast" means transmission of data for receipt by only a single subscriber station on the network, and "multicast" means transmission of information for receipt by more than one but less than all subscriber stations on the network.

Specifically, each SCM 314–317 transmits video signals to the subscriber stations over an information channel in network 302 by modulating a base band data stream onto a carrier signal and up converting the signal to a transmission frequency that complies with a conventional CATV frequency spectrum. By way of example, a downstream data modulation performed by a SCM can be a 64-ary Quadrature Amplitude Modulation (QAM) and the transmission frequency can be in the range of 54–860 MHz. These techniques are merely exemplary of a typical transmission mechanism and other modulation types and frequency bands may be used.

The SCMs 314–317 transmit control information to the subscriber stations 305–308 via a downstream command channel in transmission network 302. By way of example, such control information can be frequency multiplexed with the information channel to effect transmission on a carrier in the range of 54–860 MHz using a 1 MHz bandwidth. The subscriber stations 305–308 communicate with a corresponding SCM 314–317 via a reverse (back or upstream) channel. In an exemplary embodiment, each SCM 314–317 supports 16 such reverse channels. Each reverse channel carries, for example, a BPSK modulated signal on a carrier in the range of 5–42 MHz, where the channel capacity is approximately 64 Kbps. The exact frequency ranges, modulation types or channel capacities are not critical and can be varied. Further details of the operation of the SCMs 314–317 and other components of the headend 304 to provide VOD services are described in U.S. Pat. No. 6,253,375, issued Jun. 26, 2001, and entitled "System for Interactively Distributing Information Services", and assigned to the assignee of the present application, which is hereby incorporated by reference in its entirety.

The transmission network 302 preferably takes the form of a Hybrid Fiber Coaxial (HFC) network in which the headend 304 is coupled to the hubs 309–312 by fiber optic cabling. The hubs 309–312 are coupled to corresponding subscriber stations by coaxial cabling. Each hub 309–312 typically has capability to support hundreds to thousands of subscriber stations. The hubs 309–312 are preferably of conventional type.

The VOD service employs a number of predetermined channels in the information channel to transmit the requested video programs. By way of example, the number of channels available for use by the VOD service can be 2, 4, or 8 analog channels. The network 302 and headend 304 implement spectrum reuse at the hubs 309–312 to increase the number of channels available for the VOD service.

Each of the Logical Nodes (VOD channels per hubs 309–312) have a capability to service a limited number of subscriber stations. The number of Logical Nodes required is therefore roughly proportional to the number of subscribers being serviced by the system 100c. By way of example, each 64-QAM channel typically can service up to 80 subscribers. Depending upon the number of subscriber stations coupled to a particular hub 309–312, a particular Logical Node may service only a portion of the subscriber stations on a hub, may service all of the subscriber stations on a hub but no more, or may service subscriber stations on more than one hub. Each of these scenarios is shown in FIG. 3. For example, SCM 314 services subscriber stations on hubs 309 and 310. This would typically occur in a situation where the hubs 309 and 310 are not fully populated with subscriber stations 305, 306 or where initial service penetration is low. SCM 315 services only subscriber stations 308 on hub 312. Hub 311 has associated therewith SCMs 316 and 317 for servicing subscriber stations 307. This situation arises where a hub has coupled thereto, a number of subscriber stations that exceed the capacity of a particular SCM and requires many Logical Nodes. As the number of subscriber stations increases or decreases for a particular hub, the mapping between SCMs Logical Nodes, and subscriber stations may need to change. For example, this may happen if new homes are built or if existing subscribers cancel subscriptions to services offered by headend 304 or if new subscribers are added.

In accordance with the principles of the present invention, SCMs 314–317 can be automatically allocated to subscriber stations 305–308 based on the changing topology of the network 302 and its associated subscriber stations. Advantageously, this is performed by determining the number of subscriber stations coupled to each hub, and transmitting a Logical Node identifier (ID) to each subscriber station. The Logical Node ID provides a correspondence between an SCM and corresponding subscriber stations. For example, in FIG. 4, subscriber stations 305 and 306 correspond to a first Logical Node from nodes 1–4, subscriber stations 307 correspond at least two (third and fourth) Logical Nodes and from nodes 11–20 and the other from nodes 21-n, and subscriber stations 312 correspond to a second Logical Node from nodes 5–10.

The Logical Node IDs for the subscriber stations on the network 302 are preferably determined periodically and periodically transmitted to the subscriber stations. Preferably the Logical Node ID is transmitted as a MPEG-II (Motion Pictures Expert Group, Type II) packet which contains appropriate header information together with the Logical Node ID. MPEG type encoding is a common protocol for encoding video data and is therefore a convenient protocol for encoding of the Logical Node ID. However, the exact manner in which the Logical Node ID is encoded for transmission is not critical and other encoding techniques can be used within the principles of the present invention.

Figure 4:
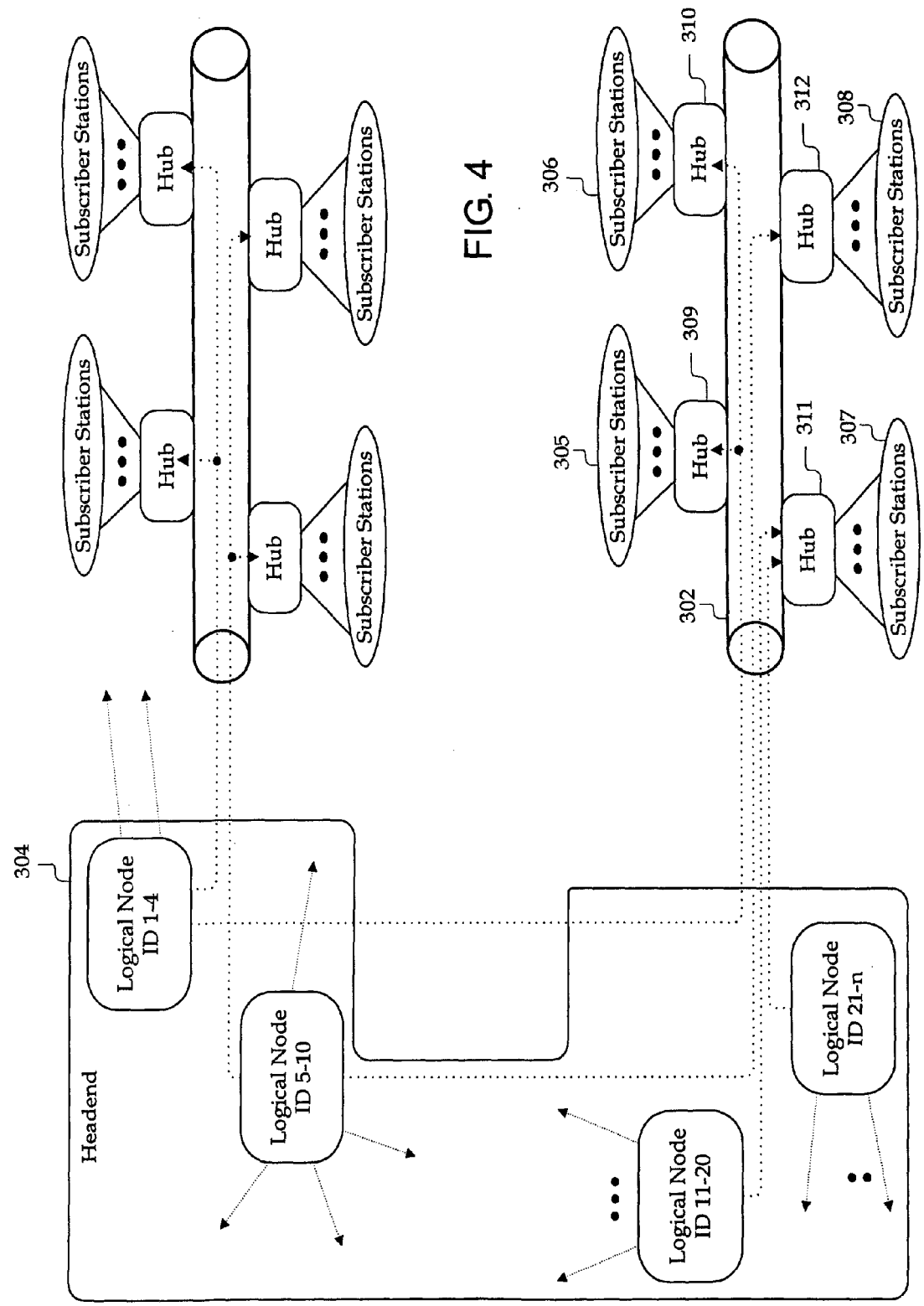
FIG. 4 is a high-level block diagram showing the session control mangers, the hubs and the subscriber stations of FIG. 3 and the Logical Nodes into which they are divided in more detail.

FIG. 4 of the drawings illustrates, by way of the example shown in FIG. 3, the manner in which the Logical Node IDs are transmitted. In FIG. 4, subscriber stations 305 and 306 are part of a first Logical Node. This information is provided to subscriber stations 305–306 by transmitting Logical Node ID 1 from headend 304 to subscriber stations 305–306. Subscriber stations 308 are part of second Logical Node. This information is provided to subscriber stations 308 by transmitting Logical Node ID for this second Logical Node from headend 304 to subscriber stations 308. Subscriber stations 307 are either part of a third Logical Node or fourth Logical Node. The corresponding node information (third Logical Node ID or fourth Logical Node ID) is transmitted to the appropriate subscriber stations 307.

The introduction of the Logical Node ID into the video stream and its use to identify the channels servicing a particular subscriber station are particularly advantageous. The provision of Logical Node ID signals in the video stream allow the subscriber stations to be moved anywhere in the network and get the video streams switched to the subscriber station based on a new Logical Node ID. For example, a particular subscriber station may be initially connected to the network and assigned to Logical Node ID 1. All the information for the subscriber including information particular to the subscriber station is provided. However, the user may move geographically, take the subscriber station and attempt to gain access from a new location being service by a different Logical Node. Since the ID of the different Logical Node is part of the stream, once it is provided to the relocated subscriber station, the headend 304 will know which channels to provide signals intended for the user. This eliminates any manual reconfiguration of the network that is required in the prior art. Rather with the present invention, the service can be updated by simply updating channel and DVM information in the SCM. Other examples where the provision of the Logical Node ID is particularly advantageous is where new nodes are created or eliminated by changes in the number of subscribers using particular channels. The use of Logical Node ID eliminates the need for any changes in manual configurations.

Figure 5:
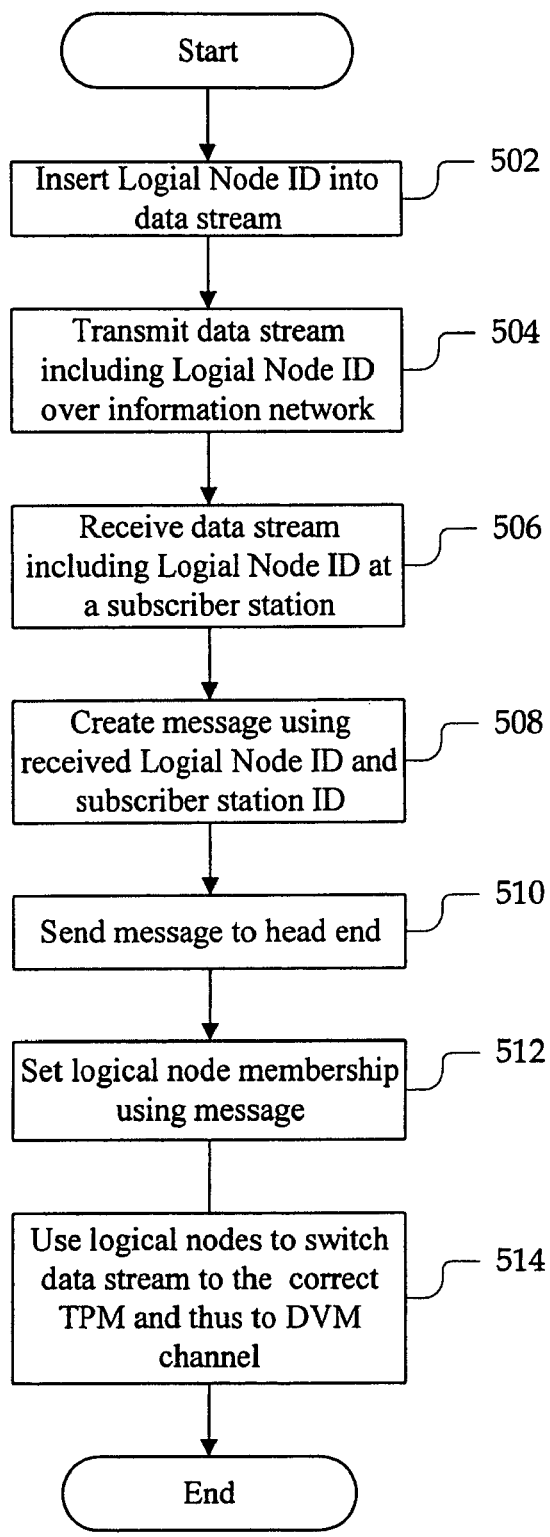
FIG. 5 is a flowchart of a general method for transmitting Logical Node identification signals and using them to configure the system and transmit data signals.
Figure 6:
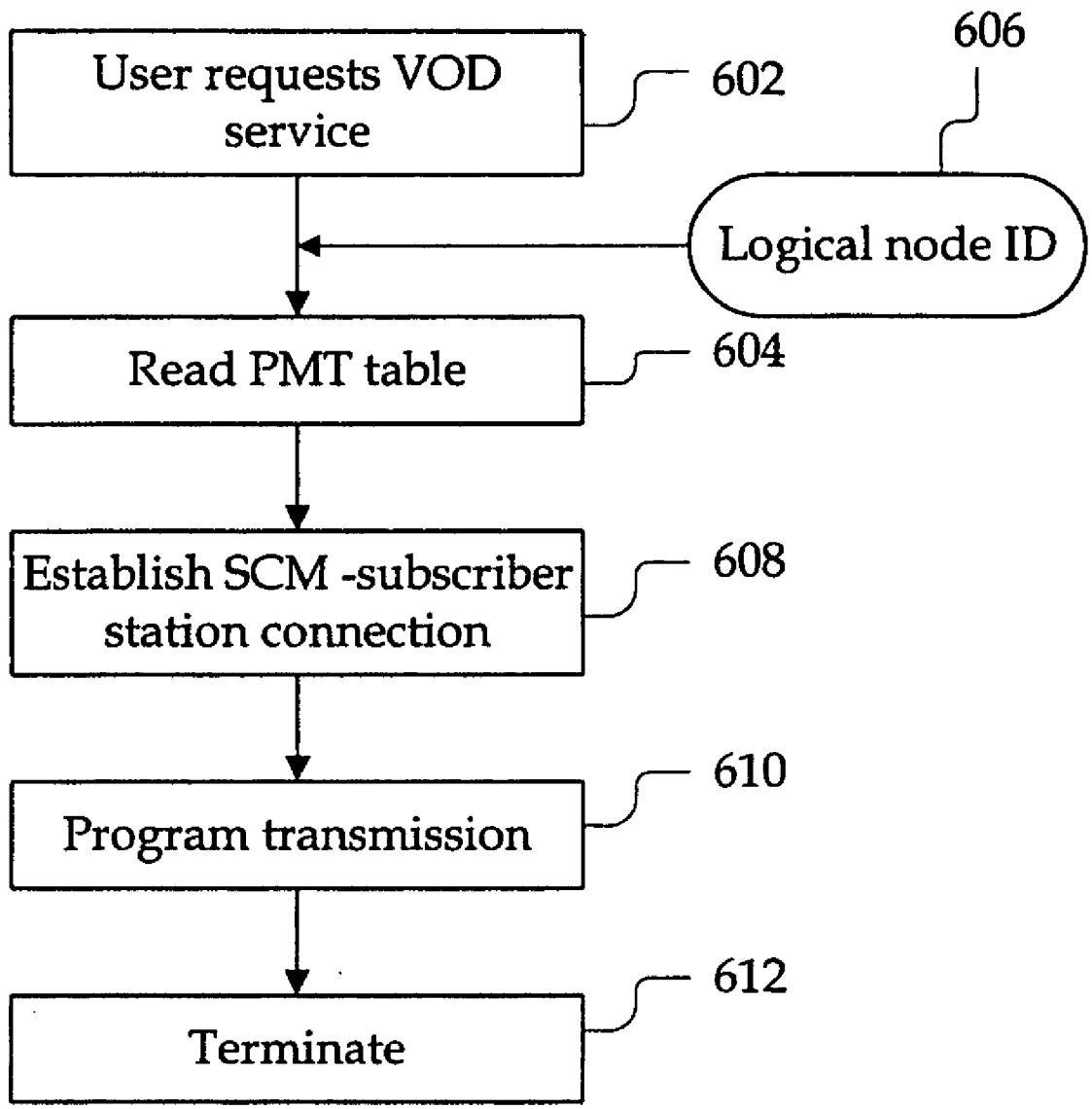
FIGS. 6 and 7 are flowcharts showing operation of the system in accordance with the principles of the present invention.
Figure 7:
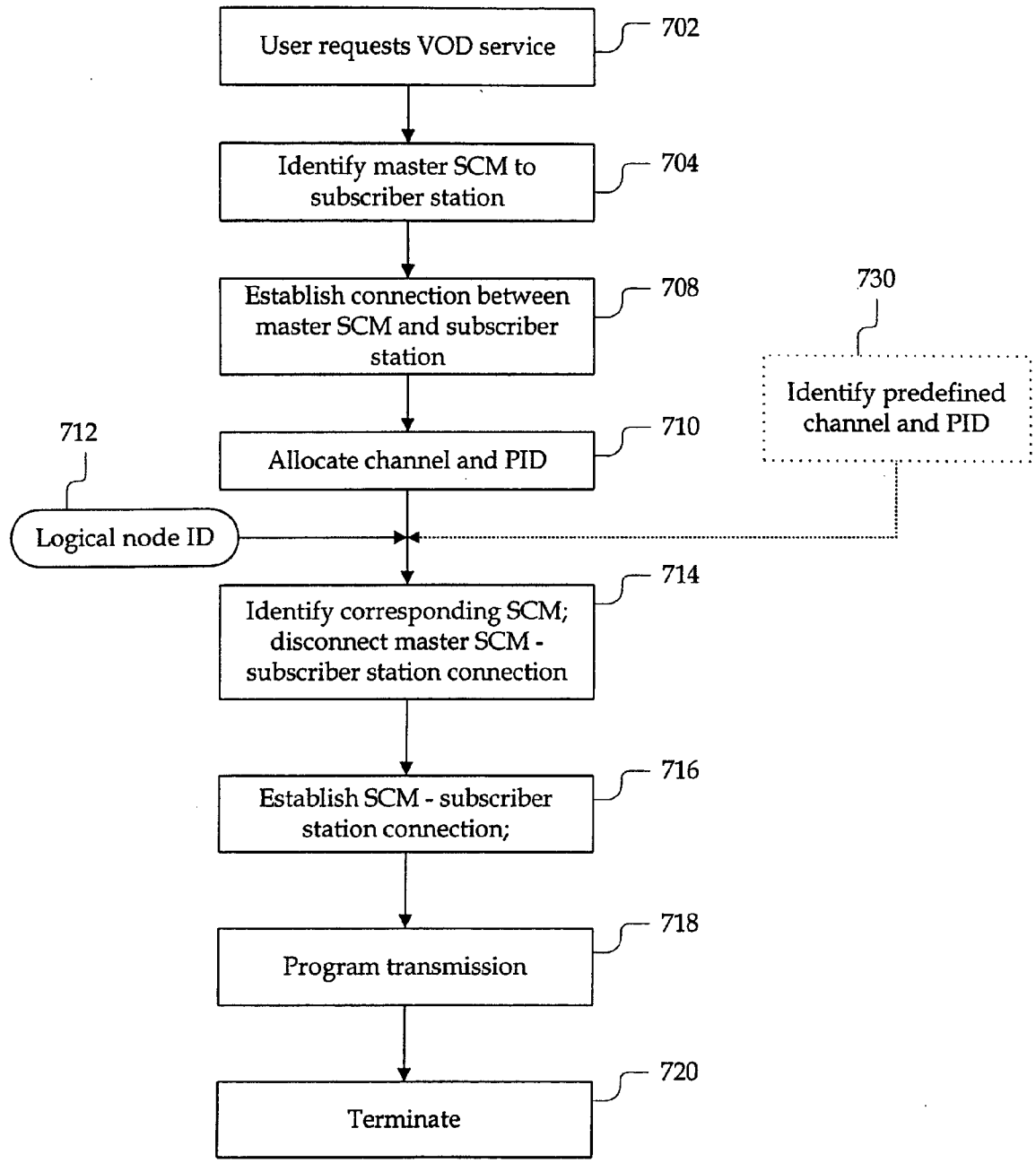

Referring now to FIGS. 5–7, the methods of the present invention for sending and using a Logical Node ID signal as part of streaming data will be described in more detail. The general method will first be discussed with reference to FIG. 5. Then a method for using the Logical Node ID to determine the appropriate channel on which to transmit a requested program is described in two embodiment with reference to FIGS. 6 and 7.

As shown in FIG. 5, the method for inserting, transmitting and using the Logical Node ID in accordance with the present invention is shown. The process begins in step 502 by generating a unique Logical Node ID for each node and inserting such Logical Node ID into the data stream. Then in step 504, the Logical Node ID signal is transmitted as part of the data stream over the information network 108. Next, in step 506, the data stream including the Logical Node ID is received at a subscriber station. Then in step 508, the subscriber station uses the Logical Node ID received to create a new message which includes the Logical Node ID. The message created in step 508 is then sent in step 510 to the headend. The combiner or headend sets the Logical Node membership using this message in step 512, and thus, the topology of the network is known by the system 100c. The system 100c can then use the information stored at the headend to switch data streams using the TPM 102b and DVM module 106b such that programs will be correctly routed even though changes may have been made to the network manually or automatically. In other words, using the Logical Node ID the TPM 102b and DVM module 106b can be assured to send data to the appropriate subscriber stations.

FIG. 6 is a flowchart showing an embodiment where the role of the master SCM in identifying the corresponding SCM and the role of the hub in providing the channel allocation information to the subscriber station are eliminated. Advantageously, elimination of such actions reduces the amount of time (and accompanying bandwidth) required to initiate VOD service. These steps are eliminated by storing the address of the corresponding SCM together with the channel allocation information in the subscriber station. This information can be stored in the subscriber station in a nonvolatile memory such as a flash memory as typically found on subscriber stations such as digital set-top boxes.

Turning to FIG. 6, at step 602, the user requests VOD by way of the corresponding subscriber station. At step 604, the subscriber station reads the Program Map Table (PMT) and at step 604 receives the periodic transmission of the Logical Node ID. At step 608, the IP address of the SCM, which is stored in the subscriber station and its listener port number are used to make a User Datagram Protocol (UDP or TCP—Transmission Control Protocol) connection between the SCM and the subscriber station. At step 610, the program transmission occurs until termination at step 612.

FIG. 7 is a flowchart showing communication between a set-top box (portion of a subscriber station) and the headend 304 to request and to receive video-on-demand (VOD) services, such as transmission of movies or other video programs. At step 702, the user requests VOD services, by entering appropriate inputs into the set-top box. At step 704, the corresponding hub responds to the request for VOD service by identifying, from information stored in the hub, an SCM that is functioning as a master SCM. At step 708, the subscriber station initiates communication with the master SCM to establish a connection between the master SCM and the subscriber station. This connection is preferably established in accordance with the User Datagram Protocol (UDP) of the TCP/IP suite of protocols. At step 710, the hub allocates a channel for transmission of the requested video program from the corresponding hub to the subscriber station. Also at step 710, the master SCM allocates a program identifier (PID) to uniquely identify the requested program. Transmission of the Logical Node ID at step 712 is performed periodically, such as for example, every one-tenth of a second, and the Logical Node ID can therefore be expected to be received by the subscriber station. In an alternate embodiment shown in FIG. 7 by dashed lines, the channel for transmission of the requested video program from the corresponding hub to the subscriber station, and the program identifier (PID) may be predefined (step 730). For example, a copy of a distributed packet having the predefined channel and PID may be stored at the subscriber station using local storage to reduce the latency in starting interactive sessions where the contents provide temporary copies of the information contained in the distributed packet. In such a case, steps 700–710 may be replaced with the single step 730 of identifying the predefined channel and PID after which the method continues with that information in step 714.

Once the subscriber station receives the Logical Node ID, it has the necessary information to communicate with the corresponding SCM, and at step 714 the UDP connection between the master SCM and the subscriber station is terminated. At step 716, a UDP connection is established between the identified SCM and the subscriber station. Once established at 716, transmission of the requested program by the SCM to the requesting subscriber station occurs 718 until the transmission is terminated at step 720.

It is to be understood that the specific mechanisms and techniques which have been described are merely illustrative of one application of the principles of the invention. Numerous additional modifications may be made to the methods and apparatus described without departing from the true spirit of the invention.

What is claimed is:

1. In a video-on-demand system having a headend which may be put in communication with a subscriber device via an intermediate node, a method for communication between the headend and the subscriber device, comprising:
   providing first identification information from the headend into a first datastream, the first identification information for routing communication to the headend;
   providing the first datastream to the intermediate node;
   providing the first datastream from the intermediate node to the subscriber device;
   in response to receiving the first datastream at the subscriber device, using the first identification information in the first datastream to provide a second datastream for the headend having second identification information, the second identification information for routing communication to the subscriber device;

providing the second datastream to the intermediate node;

providing the second datastream from the intermediate node to the headend; and establishing a session between the headend and the subscriber device in response to the headend receiving the second identification information in the second datastream.

2. The method of claim 1 wherein the headend comprises a session manager.

3. The method of claim 2 wherein the intermediate node is associated with a logical node.

4. The method of claim 3 wherein the first identification information comprises an address of the session manager.

5. The method of claim 2 wherein the second identification information comprises an identifier of the subscriber device.

* * * * *